United States Patent
Patterson

(10) Patent No.: US 6,201,330 B1
(45) Date of Patent: Mar. 13, 2001

(54) ADJUSTABLE TUNING SPRING SYSTEM FOR VIBRATORY CONVEYOR DRIVES

(75) Inventor: Harold E. Patterson, Indiana, PA (US)

(73) Assignee: FMC Corporation, Chicago, IL (US)

( * ) Notice: Subject to any disclaimer, the term of this patent is extended or adjusted under 35 U.S.C. 154(b) by 0 days.

(21) Appl. No.: 09/484,752

(22) Filed: Jan. 18, 2000

(51) Int. Cl.$^7$ ................................................... H02K 7/00
(52) U.S. Cl. ........................... 310/91; 310/17; 310/36; 198/769
(58) Field of Search .................... 198/769; 310/15, 310/17, 21, 29, 32, 51, 91, 36; 209/365.1, 365.3, 368

(56) References Cited

U.S. PATENT DOCUMENTS

| | | | |
|---|---|---|---|
| 3,089,582 | * 5/1963 | Musschoot et al. | 198/769 |
| 4,455,496 | 6/1984 | Dean et al. | 310/29 |
| 4,673,833 | 6/1987 | Dean et al. | 310/29 |
| 4,701,649 | 10/1987 | Dean et al. | 310/29 |
| 4,719,376 | 1/1988 | Dean et al. | 310/29 |
| 5,287,027 | 2/1994 | Marshall et al. | 310/21 |
| 5,293,987 | 3/1994 | Marshall et al. | 310/21 |
| 5,821,657 | * 10/1998 | Falconer et al. | 310/91 |
| 5,836,204 | * 11/1998 | Skak | 198/766 |

* cited by examiner

Primary Examiner—Burton S. Mullins
(74) Attorney, Agent, or Firm—Rockey, Milnamow & Katz, Ltd.

(57) ABSTRACT

A spring coefficient adjustment system for a vibratory drive for use in driving a vibratory delivery apparatus. The drive includes an electromagnet and an associated armature spaced apart by a gap. In the drive, a plate is movable with respect to a frame. One of the electromagnet and the armature is connected to the frame and the respective other is connected to the spring plate. A primary spring is connected between the frame and the spring plate. A plurality of auxiliary elastomer shear springs are selectively engageable between the frame and the plate to change the total spring coefficient between the frame and the plate.

21 Claims, 4 Drawing Sheets

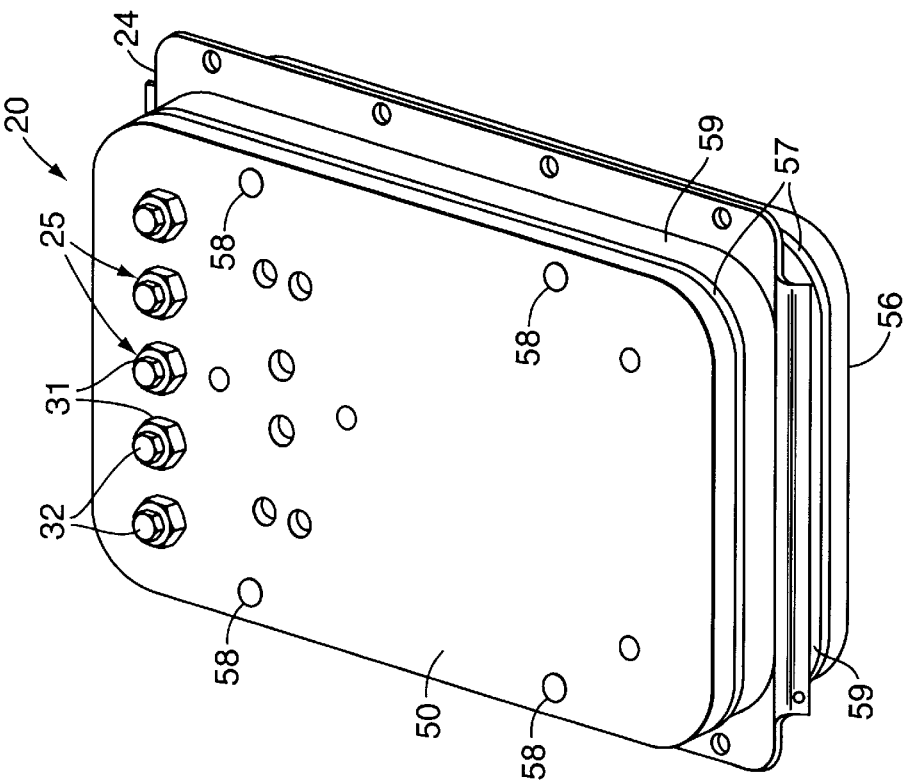
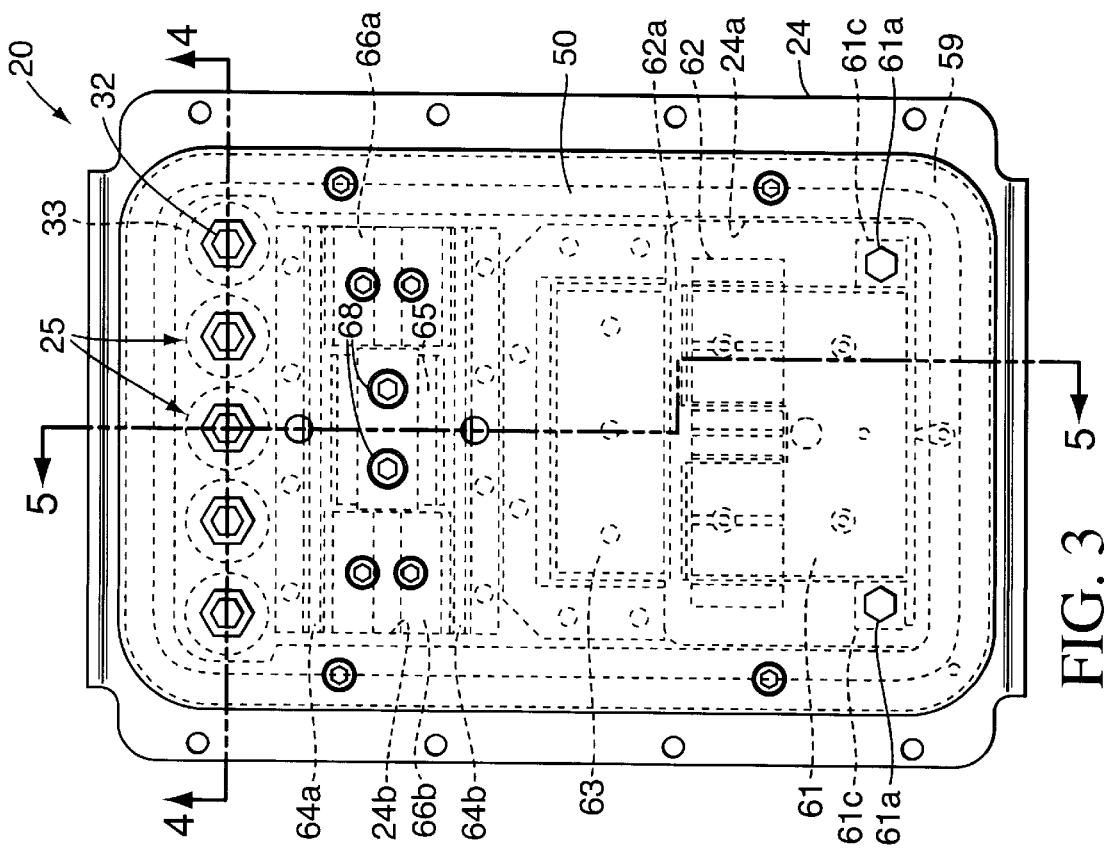
FIG. 2
FIG. 3

ADJUSTABLE TUNING SPRING SYSTEM FOR VIBRATORY CONVEYOR DRIVES

TECHNICAL FIELD OF THE INVENTION

The invention relates to vibratory drives having a vibratory exciter or motor and one or more energy storing springs. Particularly, the invention relates to a mechanism to make incremental adjustments to the natural frequency of a tuned, two mass vibratory conveyor, to optimize conveyor vibration amplitudes for a given driving force.

BACKGROUND OF THE INVENTION

For purposes of this application the term "conveyor" is used generally and includes both conveyors and feeders, or any other apparatus that conveys or delivers material.

Vibratory conveyors use a vibrating trough to move material. Vibratory conveyors are often used in industry to meter the flow of bulk material, or to convey bulk material from one point in a process to another point. For example, in the snack food industry, vibratory conveyors are used to meter snack foods such as potato chips, popcorn, corn chips and the like from storage bins; or to convey and distribute snack foods from the cooking processes to the packaging machines. Such vibratory conveyors are generally of the resonant, two mass design to minimize operating power, and to provide a means to isolate the dynamic operating forces being generated from the support structure of the respective conveyor and any other surrounding equipment.

A vibratory conveyor of this type may include a base member supported by isolating spring members attached to a support structure; and a trough member, which feeds or conveys material. The isolating spring members and the base member adapt the conveyor to the physical height positions required for the conveyor to be integrated into the process flow. In some designs, the trough member, rather than the base member, is supported by the isolating spring members.

The base member is connected to the trough member by springs arranged with their longitudinal axes at a preselected angle to the vertical, thus imparting a directed force to the material during operation and causing the material to convey along the trough member.

A drive mechanism or "driver" is also connected between the base and trough members to cause the members to vibrate or move back and forth relative to one another. The drive mechanism may be an electromagnetic system with the electromagnet core connected to the base member and the electromagnet armature connected to trough member, or a motor and crank arm system, or a motor driven rotating eccentric weight exciter, or some other similar drive system. An example of an electromagnetic driver is disclosed in U.S. Pat. No. 5,293,987.

The natural frequency of the conveyor's mass and spring system (i.e., the frequency at which they would freely vibrate if struck by a hammer) is set to be close to its operating frequency or "speed" to take advantage of the phenomenon of "resonance." At resonance, energy stored in the spring system as it operates is returned to be "in phase" with the applied driving force, reducing the power required to operate the conveyor to about 25% or less of what would be required in a direct drive system.

The relationship of the natural frequency of a linear two mass vibratory system to the combined weight of the base and trough, and to the spring rate, may be expressed by equation (1):

$$N_o = \frac{1}{2\pi} \cdot 60 \cdot \sqrt{\frac{K_d \cdot g}{W_R}} \quad (1)$$

where:
 $N_o$=The natural frequency in cycles per minute,
 $K_d$=The dynamic spring rate in lbs. per in. of deflection,
 g=The acceleration due to gravity in inches per sec$^2$, and
 $W_R$=The resultant or effective weight of the conveyor system, $$= \frac{W_t \cdot W_b}{W_t + W_b}$$

and where:
 $W_t$=The weight of the conveyor trough in lbs.
 $W_b$=The weight of the conveyor base in lbs.

In practical linear two mass vibratory system designs, the ratio of the operating frequency to the natural frequency, sometimes indicated by the Greek letter Lambda (λ), defined by equation (2), usually is set by the design parameters to lie within the range of 0.8 to 1.2. Generally, the closer λ approaches 1, the greater the amplitude of the conveyor for a given driving force.

$$\lambda = \frac{N}{N_o} \quad (2)$$

where:
 N=The operating frequency in cycles per minute, and
 N=The natural frequency in cycles per minute.

A λ value of 1 indicates the conveyor would be operating exactly at resonance. A λ value less than 1 indicates the conveyor would be operating sub-resonant (i.e., the natural frequency is greater than the operating frequency). A λ value greater than 1 indicates the conveyor would be operating super-resonant (i.e. the natural frequency is less than the operating frequency).

Operation exactly at resonance is usually avoided since the system would be highly sensitive and erratic, involving the possibility of highly destructive vibration amplitudes in lightly damped systems. In applications involving heavy trough loads, it may be desirous to use a sub-resonant conveyor design because such design is less sensitive to changes in vibration amplitude with changes in load. For example, since an incremental increase in the load can effectively increase the trough mass, the natural frequency would decrease. Thus, applying equation (1), λ increases, moving closer to 1 (resonance). The move toward resonance offsets the loss in amplitude caused by the damping effect of the increased load.

In applications involving light trough loads, it may be desirous to use a super-resonant conveyor design because such a design requires less spring rate and is therefore less costly. Also, such conveyors are more reliable to use in some applications because the material feed rate decreases with increasing material load, thus preventing equipment damage and possible downstream material flooding. For example, since an increase in the material load effectively increases the trough mass, the natural frequency would decrease. Thus, applying equation (1), λ increases, moving farther away from 1 (resonance). The movement away from resonance further decreases amplitude already decreased by the damping effect of the load.

Therefore, it is advantageous to be able to operate a conveyor at a pre-selected ratio λ of its operating frequency to its natural frequency. In order to operate the conveyor at the pre-selected ratio λ, compensation for varying parameters may be required. The natural frequency of the conveyor is dependent on the conveyor's spring coefficient and the spring coefficient can change over time. If some form of polymer spring is used, such as natural or synthetic rubber, the spring rate can increase with use, as the polymer continues to cure or age. Also, the natural frequency of the conveyor is dependent on the operating weight of the conveyor. The operating weight of the conveyor can be different than the original design weight due to variations within manufacturing tolerance, or modifications to the conveyor in the field.

Furthermore, the amplitude of vibration is affected not only by λ, but also by the driver's available power to deflect the spring/mass system, and to overcome the various system losses due to friction and damping. The driver's available power can be limited. In many conveyor designs, the operating frequency is fixed by a relationship to the power line frequency or is fixed to a fixed speed motor, or the like. The available power is also usually fixed as pre-established by the design limitations for a given model. Manufacturing and material tolerances, abrasive wear, and sometimes unauthorized modifications to the trough or base members in the field, reduce available power and have a detrimental effect on the trough amplitude. Given limitations in available power, it is important to optimize conveyor stroke amplitudes.

The present inventor has recognized that it would be desirable to provide an effective apparatus to adjust or "tune" conveyor parameters to obtain or to maintain the desired trough amplitude given the driver's available power. The present inventor has recognized that it would be desirable to provide an effective apparatus to tune conveyor parameters to offset changes in conveyor component weights or changes in spring coefficients.

SUMMARY OF THE INVENTION

The inventive approach to tuning a conveyor to operate at a pre-selected λ, is to change the natural frequency $N_o$ of the conveyor's mass and spring system to be closer to, or further away from, the operating speed N of the conveyor. The approach adjusts $K_d$, the dynamic spring rate of the conveyor drive, to adjust the natural frequency $N_o$ of the conveyor. The present invention provides a simple, cost effective system and apparatus, incorporated into the design of a conveyor drive, to easily adjust $K_d$. The invention can be used to tune a conveyor to a desired λ or to optimize material feed rate given the available driver power, or to tune the conveyor for any other operating consideration.

The apparatus of the invention includes at least one selectively engage able auxiliary spring assembly to adjust the dynamic spring coefficient of the conveyor drive. The drive includes an electromagnetic driver, or other type vibratory driver, a frame and a plate, the plate moveable with respect to the frame. The frame can be operatively connected to a base member and the plate can be operatively connected to a trough member. Preferably, an electromagnet is connected to one of the frame and the plate, and an armature is connected to the respective other of the frame and the plate. An elastomer primary spring is connected between the plate and the frame. Oscillating magnetic interaction between the electromagnet and the armature, along with energy stored in the primary spring, cause the plate and the frame, and thereby the trough member and the base member, to relatively vibrate or oscillate. The auxiliary spring assembly is mounted to the frame and is selectively engageable to the plate. Engagement of the auxiliary spring assembly increases the spring rate of the drive by a pre-selected amount.

According to the preferred embodiment, a plurality of auxiliary spring assemblies are mounted to the frame and are selectively engageable to the plate, to incrementally adjust the spring rate between the frame and the plate. Each auxiliary spring assembly includes an elastomer spring element positioned closely adjacent to the plate, and an adjusting bolt, connected to the elastomer spring element and threaded into a bore of the frame. Advancing the adjusting bolt in the bore compresses the elastomer spring element against the plate. Each elastomer spring element, when engaged to the plate, acts as a shear spring between the frame and the plate. The auxiliary spring assemblies can be identically sized and configured, or alternatively, can have different spring values. The different spring values can be set by different elastomer spring element sizes or by different elastomer hardnesses.

While the preferred embodiment of the invention is applied to a non-linear electromagnetic driven conveyor drive, such as FMC Corporation's model VF series conveyor (such as described in U.S. Pat. No. 5,293,987), it is understood that the invention could also be applied, through minor modification, to many other conveyor designs.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 2 is an enlarged perspective view of a vibratory drive incorporated into the conveyor of FIG. 1;

FIG. 3 is a plan view of the vibratory drive of FIG. 2 with inside components shown in dashed lines;

DETAILED DESCRIPTION OF THE PREFERRED EMBODIMENTS

Figure 1:
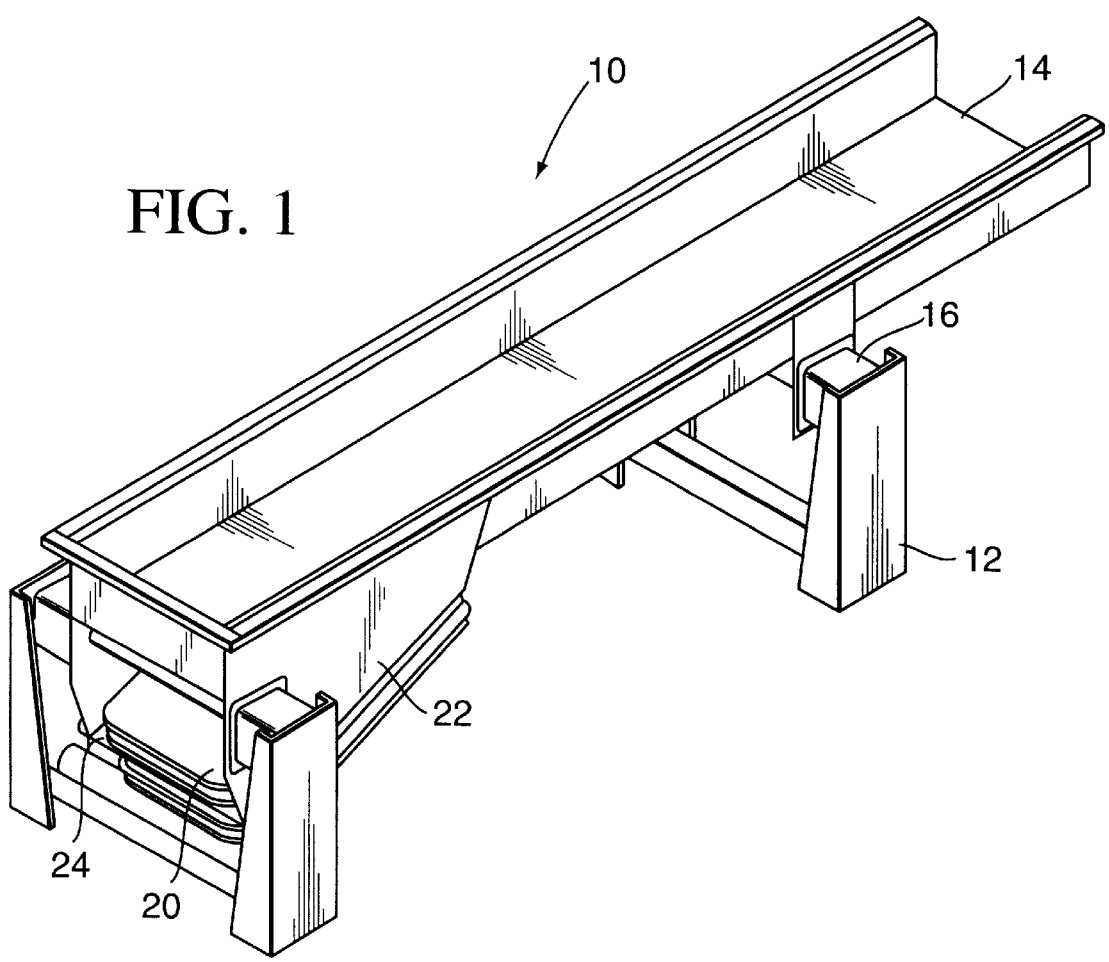
FIG. 1 is a perspective view of a vibratory conveyor incorporating the present invention.

While this invention is susceptible of embodiment in many different forms, there are shown in the drawing, and will be described herein in detail, specific embodiments thereof with the understanding that the present disclosure is to be considered as an exemplification of the principles of the invention, and is not intended to limit the invention to the specific embodiments illustrated.

To tune a two mass vibratory conveyor, the conveyor's natural frequency can be adjusted to be closer to, or further from, the operating frequency. From equation (1), it can be derived that the natural frequency $N_o$ could be adjusted by incrementally changing either the resultant weight $W_R$, or the dynamic spring rate $K_d$. To adjust the resultant weight $W_R$, blocks of steel could be added or removed from either the trough member or the base member of the conveyor. Adding weight lowers $N_o$, while removing weight raises $N_o$. These weights however, cannot be arbitrarily added to, or subtracted from, the conveyor structure, as such point loads can cause dynamic operating problems that could result in unwanted pitching or bending of conveyor structural elements. The conveyor structure could be specifically designed to accommodate the adding or subtracting of weights in such a manner as to avoid the dynamic motion problems. However, a trained service technician would be required to remove and add the weights correctly, a cumbersome procedure involving equipment down time, and therefore a costly adjustment.

To adjust the dynamic spring rate $K_d$, of heretofore known conveyor designs, spring elements could be added to, or subtracted from, the conveyor. Increasing the spring rate $K_d$ raises $N_o$, while decreasing the spring rate $K_d$, lowers $N_o$. However, a trained service technician from the manufacturer would be required to remove and add the springs correctly. The procedure would involve excessive equipment down time and a costly adjustment. If polymer/rubber springs are utilized in the design, it becomes even more difficult since the spring units are typically molded in prefixed dimensions, and space to mount the spring units is restricted by the geometry of the design.

The invention provides an auxiliary spring apparatus that contributes to the two mass vibratory conveyor's total dynamic spring rate $K_d$, in a form that can be simply and conveniently added or removed in incremental amounts to change the effective dynamic spring rate $K_d$. Changing the effective dynamic spring rate $K_d$ incrementally changes the natural frequency $N_o$ to make the operating speed N closer to, or further from, resonance as may be required to obtain a desired operating performance.

FIGS. 1 through 7 illustrate how the invention is applied in a two mass electromagnetic vibratory conveyor. The conveyor drive employs a non-linear spring system, the spring rate of which increases rapidly, in a non-linear fashion, as spring deflection increases, to prevent the conveyor from over-stroking. The non-linear spring system generally allows larger strokes from closing-air-gap magnets. This is an efficient, low cost, electromagnet design for vibratory conveyors. The magnet force generated by the closing-air-gap magnet is approximately inversely proportional to the square of the gap distance. Therefore, as the gap closes, the non-linearity of the spring system compensates for the non-linear increasing force of the electromagnet, to prevent over-stroking, and to prevent the magnet armature and core pole faces from colliding.

The attributes of the non-linear spring design however are not required to the implementation of the invention. The conveyor described below is an example to illustrate a preferred embodiment of the invention.

The general environment of the invention 10 is shown in FIG. 1. This type of conveyor, in a preferred embodiment, might be used to feed lightweight materials such as snack foods, cereals, and other low density products. The conveyor could also be sized and configured for conveying many different materials from high density materials such as metallic fasteners, to low density materials such as foam packaging. The conveyor could be configured to convey mined or manufactured materials such as rock, coal, cement, etc.

A conveyor trough member 14 is mounted, via vibration isolators 16, to legs 12. The conveyor 10 includes an electromagnetic drive 20, which is attached to wing plates 22, which are integral with the conveyor trough member 14. The attachment of the drive is facilitated by bolting the drive 20, through the center plate 24 of the drive, to the wing plates 22.

FIGS. 2 and 3 illustrate the drive 20 incorporating auxiliary spring element assemblies 25 of the invention. The general construction and operation of such a drive 20 is described in U.S. Pat. No. 5,293,987, herein incorporated by reference.

The drive 20 includes a top cover plate 50, a bottom cover plate 56, rigid spacers 57, the center plate 24, and primary elastomer (such as polymer/rubber) spring elements 59. The top cover plate is fastened to one spacer 57 by fastener 58, and the bottom cover plate is fastened to another spacer 57 in similar fashion. Each primary spring element 59 can be bonded, by vulcanizing means, to one of the spacers 57 on one side and to the center plate 24 on the other side. The spacers 57 are preferably composed of steel. The spacers 57 and the spring elements 59 are rectangularly shaped.

FIG. 3 illustrates an electromagnet core assembly 61, with magnet coils 62, located within an aperture 24a of the center plate 24. The core assembly 61 is fixedly attached by fasteners 61a to the top cover plate 50 and by fasteners 61b to the bottom cover plate 56 (shown in FIG. 5). An electromagnet armature assembly 63 is mounted to the center plate 24 separated by a gap 62a from the core assembly 61.

Also shown in FIG. 3 are non-linear spring system components. Bumper bars 64a and 64b are attached to the center plate 24, one on each side of an opening 24b cut in the center plate 24. First stage spring element assemblies 66a, 66b, and a second stage spring element assembly 65 are operationally attached to the top cover plate 50 and the bottom cover plate 56 and are located within the opening 24b cut in the center plate 24. As described below with respect to FIG. 5, the bumper bars 64a, 64b engage the first and second stage spring element assemblies 66a, 66b, 65 during oscillation of the center plate 24.

Figure 4:
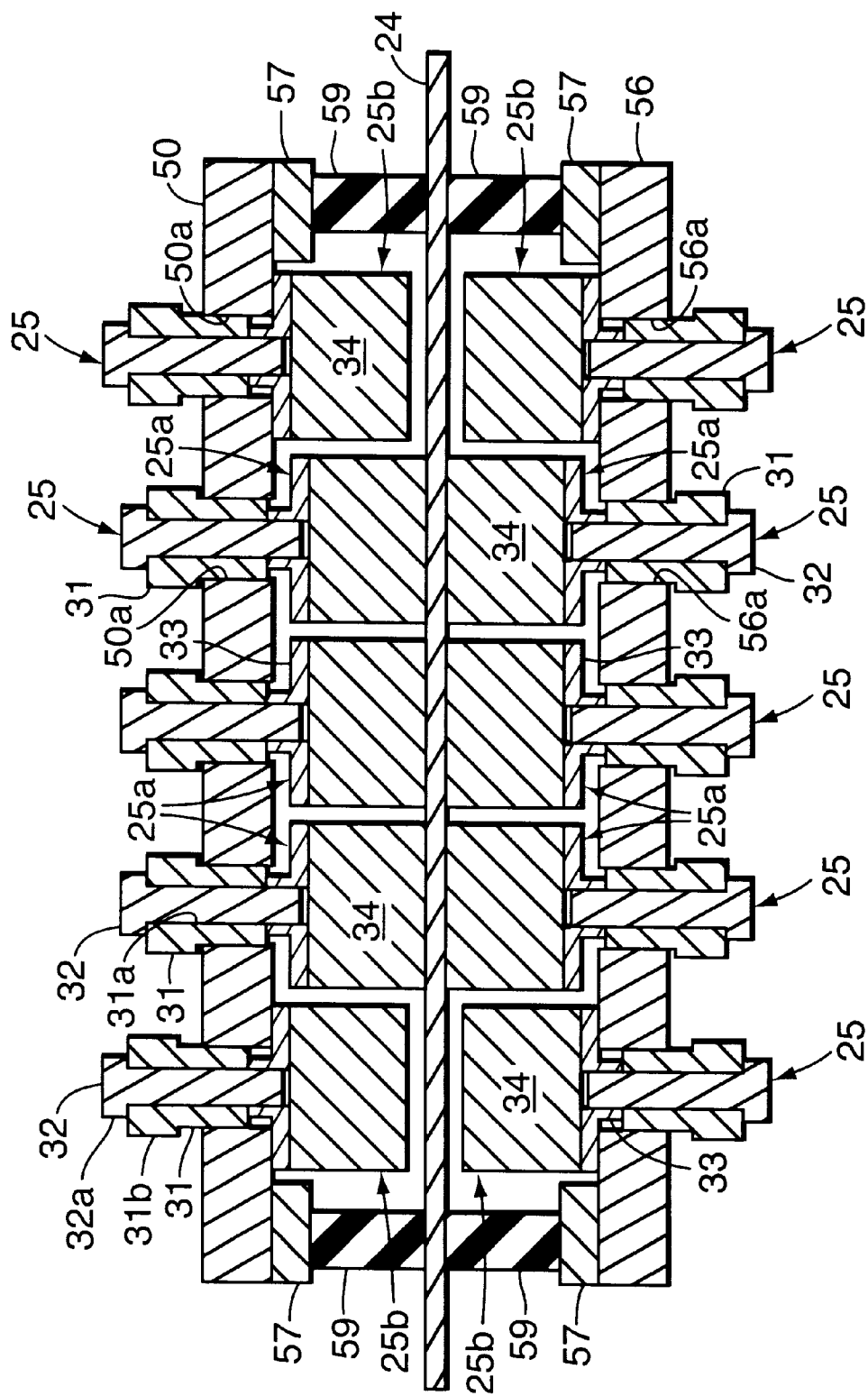
FIG. 4 is a sectional view taken generally along line 4—4 of FIG. 3.

Five auxiliary spring element assemblies 25 are shown in FIGS. 2 and 3; five auxiliary spring element assemblies 25 are located on an opposite side of the center plate 24 (shown in FIG. 4).

Figure 6:
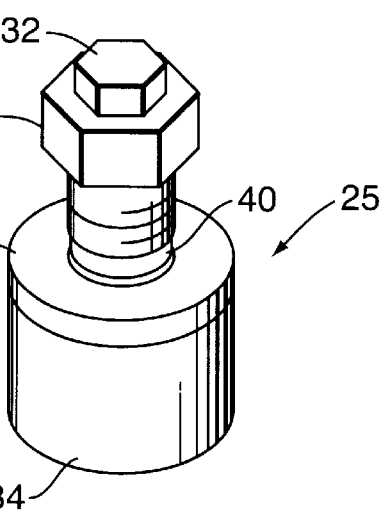
FIG. 6 is a perspective view of an auxiliary spring element assembly.
Figure 7:
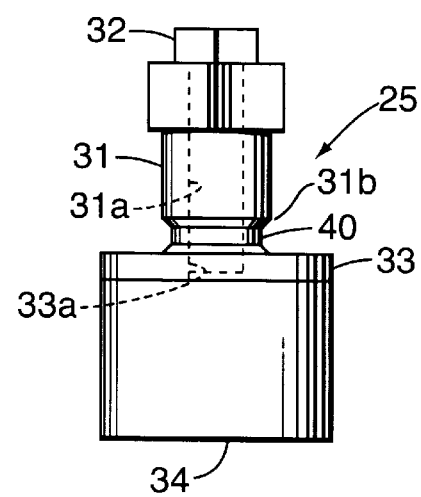
FIG. 7 is an elevational view of the auxiliary spring element assembly of FIG. 6.

Referring to FIGS. 6 and 7, one auxiliary spring element assembly 25 is illustrated in isolation. The auxiliary spring element includes a threaded depth adjusting bolt 31, that has been drilled through its longitudinal axis, forming a plain bore 31a. The bore 31a accepts a cap screw 32. A spring element bonding disc 33, having a central boss 40, is located at an end 31b of the adjusting bolt. The boss 40 and a remaining thickness of the disc 33 are drilled and tapped, forming a threaded hole 33a. The cap screw 32 is advanced into the threaded hole 33a of the spring element bonding disc 33.

An elastomer spring element 34 is bonded, such as by vulcanizing, to the disc 33. The spring element can be composed of a polymer/rubber material. The spring element 34 could be attached to the disc 33 by alternate means such as by a mechanical clamping arrangement, by an adhesive, or by other means. The spring element 34 and the disc 33 illustrated have circular perimeters, although other shapes are encompassed by the invention.

Referring back to FIG. 2, five threaded depth adjusting bolts 31 are exposed on the top side of the top cover plate 50. In similar fashion five threaded depth adjusting bolts 31 are exposed on a bottom side of the bottom cover plate 56 (see FIG. 4). The adjusting bolts 31 can be turned to engage or disengage an auxiliary spring from an outside of the drive 20.

FIG. 4 illustrates five spring element assemblies 25 are mounted on one side of the center plate 24 and five spring element assemblies 25 are mounted on the opposite side. Six auxiliary spring element assemblies 25 (indicated as "25a") are shown in an engaged position with the center plate 24, while four other auxiliary spring element assemblies 25 (indicated as "25b") are shown in a disengaged position. Prior to assembly of the top and bottom cover plates 50, 56, the depth adjusting bolts 31 are advanced into the threaded through holes 50a, 56a. The cap screws 32 are inserted into the plain bores 31a in the depth adjusting bolts 31, and advanced into the threaded holes 33a of the spring element bonding discs 33 to which the elastomer spring elements 34 are bonded. The cap screws 32 are advanced until the heads of the cap screws 32 are locked against the surface of the heads of the depth adjusting bolts 31, to securely hold the discs 33, and the associated spring elements 34, in place.

The cover plates 50, 56, with the installed assemblies 25, can then be fastened to the spacers 57 to form the body of the drive. The cap screws 32 prevent the spring element bonding discs 33 and spring elements 34 from falling into the interior of the drive during engagement or disengagement of the auxiliary spring assembly 25.

To engage an auxiliary spring assembly 25, the cap screw 32 is loosened slightly and the depth adjusting bolt 31 is merely screwed into the threaded through hole 50a or 56a from outside of the drive 20, until a head thereof is bottomed against the respective cover plate 50, 56.

The cap screw is loosened slightly before engagement of the spring assembly so that the disc 33 and the spring element 34 can remain rotationally stationary with the plate 24 during precompression of the spring element while the adjusting bolt 31 is turned, i.e., the cap screw is loosened only by an amount sufficient for the bolt 31 to rotate relative to the disc 33. This prevents tortional twisting of the spring element 34 during precompression against the plate 24. After the assembly 25 is engaged, the cap screw 32 is re-tightened against the bolt 31.

The length of the depth adjusting bolts 31 can be pre-selected so that the spring elements 34 arc compressed a pre-selected amount after contacting the surface of the center plate 24 to prevent the spring elements 34 from going into tension during operation of the conveyor. The pre-selected compression amount is important because if the spring elements 34 were to go into tension from deflecting an amount greater than an applied compression pre-loading, the elements 34 would overheat to the point of melting. Also, the fiction force between the element 34 and the plate 24 caused by the compression force thus generated is pre-selected to be greater than the shear forces generated by the operation of the conveyor. The compression force prevents slippage of the spring elements 34 on the surface of the center plate 24 and ensures that the full spring rate of the element is obtained. Once engaged, the auxiliary spring assembly 25 acts as a shear spring between a respective one of the top and bottom covers 50, 56 and the center plate 24.

To disengage an auxiliary spring element assembly 25, a respective cap screw 32 is loosened slightly and a respective depth adjusting bolt 31 is unscrewed from an outside of the drive 20, until the spring element 34 is free and clear of the surface of the center plate 24. The cap screw 32 is loosened to prevent tortional twisting of the element 34 during turning of the adjusting bolt 31 i.e., the cap screw is loosened only by an amount sufficient for the bolt 31 to rotate relative to the disc 33. The depth adjusting bolt 31 is unscrewed until the respective disc 33 is pulled tightly against top or bottom plate 50, 56, and the cap screw 32 is then re-tightened.

Thus, incrementally changing the spring rate is simply and easily accomplished without having to dismantle the drive assembly, and with minimum down time of the conveyor if in a production setting.

Figure 5:
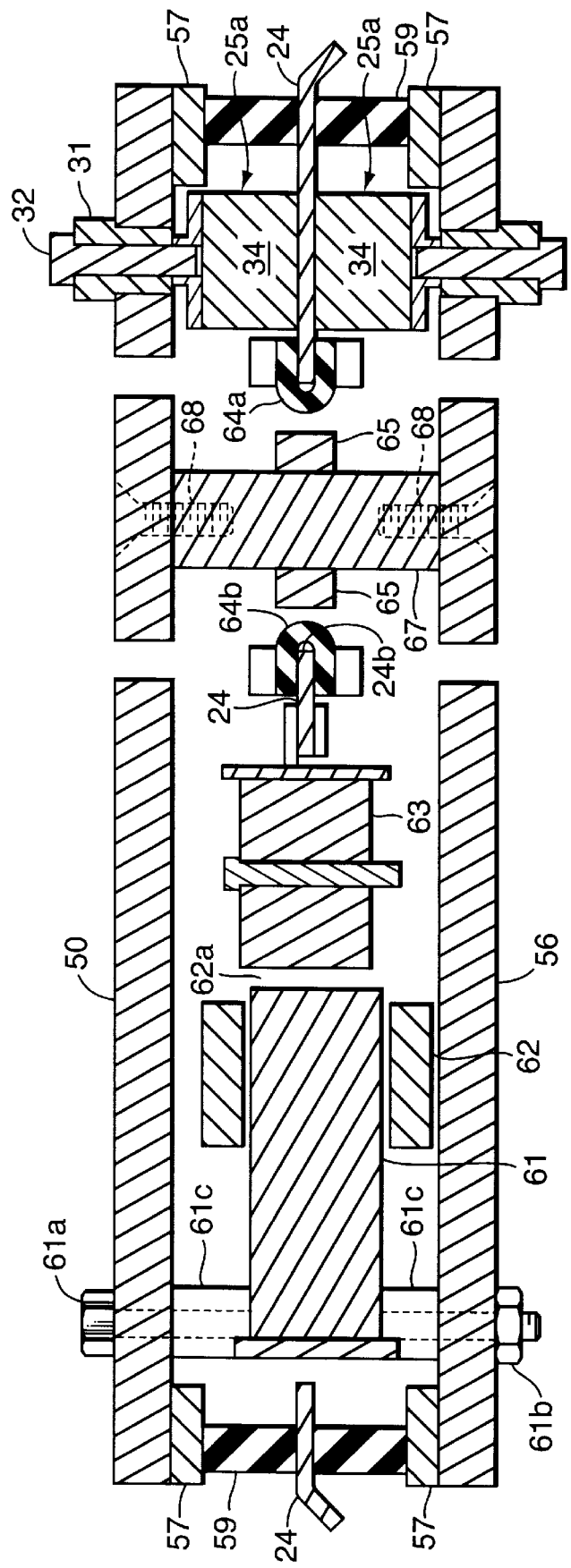
FIG. 5 is a sectional view taken generally along line 5—5 of FIG. 3.

FIG. 5 illustrates the cross sections of the top cover plate 50 and the bottom cover plate 56, and a support block 67 connected to the top cover plate 50, and to the bottom cover plate 56. The second stage spring element assembly 65 is attached to the support block 67. The support block 67 is fastened to the top and bottom plates 50, 56 by fasteners 68. Also illustrated are the bumper bars 64a and 64b, attached to the center plate 24, one on each side of the opening 24b cut in the center plate 24. The bumper bars 64a, 64b move with the center plate 24 and are aligned to impact first the first stage spring element assemblies 66a, 66b and then the second stage spring element assembly 65 in alternate directions of movement. The armature 63 is also shown attached to the center plate 24. The electromagnet core 61, with the magnet coil 62 attached, is connected by through bolts 61a, and nuts 61b, via stanchions 61c to the top cover plate 50 and the bottom cover plate 56. The top and bottom cover plates 50, 56 and the spacers 57, comprise a substantially rigid frame to which the electromagnet core 61 is attached. The center plate 24 connects the trough member 14 to the electromagnet armature, and is connected via the combination of spring systems that provide the non-linear total spring rate of the conveyor, to the cover plates 50, 56.

In FIGS. 6 and 7, one auxiliary spring element assembly 25 is shown in plan and in perspective view. The spring element 34, in the illustrated embodiment could be 2½" in diameter, 1½" long, and be of a pre-selected durometer as to have a spring rate of approximately 165 lbs./in. If ten auxiliary spring element assemblies 25 were utilized as illustrated in FIG. 4, then up to 1650 lbs./in. could be added to the primary spring system 59 in increments of 165 lbs./in. If the total rate of the primary spring system 59 was 6000 lbs./in., then the total spring rate of the spring system could range between 6000 lbs./in. and 7650 lbs./in., in ten incremental steps of 165 lbs./in. This represents a total of +/−27.5% change in spring rate, and a considerable flexibility in conveyor design.

It is noted that varying elastomer hardnesses or "rubber durometers" could be used for the spring elements 34, or varying diameters for the spring elements 34 could be used, to obtain a different overall spring rate change for each engaged auxiliary spring assembly 25a. Also, different numbers of the spring assemblies 25 could be used in some drive sizes to obtain desired results.

The invention also provides a method of designing a conveyor drive. First, a trough member would be designed to meet the application requirements, and its weight calculated. A drive size of sufficient power to obtain the desired operating characteristics would then be selected having auxiliary spring assemblies 25 of a suitable size and number to compensate for any foreseen variation. In any case, the design for any given trough weight should be such that some of the auxiliary spring assemblies 25 would initially be engaged, for example 4 to 8 auxiliary spring assemblies of a 10 auxiliary spring assembly 25 set. This allows for compensating for the aging of the elastomer springs, and at the same time allows for some compensation for a heavier-than-designed trough weight.

One of the practical problems solved by the invention is the particular problem encountered with conveyor designs that utilize elastomer springs. The spring rates of elastomer springs tend to increase as the springs age, or continue to "cure" over time. In known conveyors, as the spring rate slowly increased, the conveyor stroke, and consequently the material feed rate, decreased as the conveyor's tuning relationship drifted further from its initial setting. Eventually, the drive mechanism had to be replaced, and the old drive reworked at the factory. This problem is now easily resolved with a conveyor utilizing the disclosed invention, as it would only be necessary to disengage one or two of the spring assemblies 25 in the field to move the system back to its correct tuning to restore the design stroke.

Another problem is effectively resolved with the conveyor design of the invention. Variations in component weight due to thickness variations within manufacturing tolerances might cause a trough member, for example, to weigh more or less than the design amount. Several other factors, such as field modifications to the conveyor, may also cause the conveyor stroke to be different from the desired design stroke. According to the invention, it is only necessary to engage or disengage some of the spring assemblies 25 to tune the conveyor to obtain the desired stroke and feed rate. This flexibility saves time and reduces manufacturing costs compared to dismantling drives, or modifying components to obtain the desired operating characteristics for the conveyor.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A drive for use in driving a vibratory delivery apparatus, comprising:
   a frame;
   a vibratory motor mounted to said frame;
   a plate mounted for sliding movement with respect to said frame;
   a first spring connected between said frame and said plate;
   at least one auxiliary shear spring mounted to said frame and selectively engageable to said plate to increase a spring coefficient between said frame and said plate.

2. The drive according to claim 1, wherein said auxiliary shear spring is one of a plurality of auxiliary shear springs, each mounted to said frame and selectively engageable to said plate.

3. The drive according to claim 1, wherein said auxiliary shear spring is manually selectively engageable.

4. The drive according to claim 1, where said auxiliary shear spring is selectively engageable by a force exerted externally of said drive, without requiring disassembly of said drive.

5. A drive for use in driving a vibratory delivery apparatus, comprising:
   a frame;
   a vibratory motor mounted to said frame;
   a plate mounted for sliding movement with respect to said frame;
   a first spring connected between said frame and said plate;
   a plurality of auxiliary springs mounted to said frame and selectively engageable to said plate to increase a spring coefficient between said frame and said plate; and
   wherein each said auxiliary spring comprises an elastomer spring element carried by an adjusting bolt, said adjusting bolt threaded into a bore in said frame for threaded advancement toward said plate.

6. An electromagnetic drive for use in driving a vibratory delivery apparatus, said electromagnetic drive comprising:
   an electromagnet and an associated armature spaced apart by a gap;
   a frame;
   a plate movable with respect to said frame;
   one of said electromagnet and said armature connected to said frame and the respective other connected to said plate;
   a first spring connected between said frame and said plate;
   an auxiliary shear spring selectively engageable between said frame and said plate to change the total spring coefficient between said frame and said plate.

7. The drive according to claim 6, wherein said auxiliary shear spring is manually selectively engageable.

8. The drive according to claim 6, where said auxiliary shear spring is selectively engageable by a force exerted externally of said drive, without requiring disassembly of said drive.

9. An electromagnetic drive for use in driving a vibratory delivery apparatus, said electromagnetic drive comprising:
   an electromagnet and an associated armature spaced apart by a gap;
   a frame;
   a plate movable with respect to said frame;
   one of said electromagnet and said armature connected to said frame and the respective other connected to said plate;
   a first spring connected between said frame and said plate;
   an auxiliary spring selectively engageable between said frame and said plate to change the total spring coefficient between said frame and said plate; and
   wherein said frame includes a threaded hole, and said auxiliary spring comprises an adjusting bolt threaded into said hole, and an elastomer spring element connected to an end of said adjusting bolt, advancement of said adjusting bolt pressing said elastomer spring element to said plate.

10. The drive according to claim 9, wherein said frame includes first and second covers each having a threaded hole, said first and second covers arranged on opposite sides of said plate, and said auxiliary spring comprises a first auxiliary spring and said adjusting bolt is advanced in said threaded hole of said first cover, and said drive comprises a second auxiliary spring having a second adjusting bolt threaded into said threaded holes of said second cover, and a second elastomer spring element connected to an end of said second adjusting bolt, advancement of said second adjusting bolt pressing said second elastomer spring element to said plate on a side of said plate opposite to said first auxiliary spring element.

11. The drive according to claim 10, wherein said first spring comprises first and second elastomer elements arranged on opposite sides of said plate and attached thereto on inside facing surfaces of said first and second elastomer elements, said first and second elastomer elements respectively connected to said first and second covers on outside facing surfaces of said first and second elastomer elements.

12. The drive according to claim 11, further comprising a secondary spring element arranged within said frame and attached thereto, and a bumper connected to said plate and located to impact said secondary spring element given movement of said plate with respect to said flame.

13. The drive according to claim 10, comprising a first plurality of auxiliary springs on one side of said plate and a second plurality of auxiliary springs on an opposite side of said plate, said first and second pluralities being selectively engageable to tune the spring coefficient between said frame and said plate.

14. The drive according to claim 9, wherein said adjusting bolt includes a bore, and said auxiliary spring includes a mounting disc having a threaded hole, said elastomer spring element fixed to said mounting disc, and a fastener inserted through said bore and threadingly advanced into said threaded hole to fix said disc to said adjusting bolt.

15. The drive according to claim 14, wherein said disc includes a boss extended toward said adjusting bolt in contact therewith.

16. The drive according to claim 9, wherein said adjusting bolt includes a stop surface preset for bottoming against said frame when said elastomer spring element is pre-compressed a pre-selected amount to prevent said elastomer spring element from being in tension during operation of said drive.

17. The drive according to claim 16, wherein said stop surface is formed on a bottom surface of a head of said adjusting bolt.

18. An electromagnetic drive for use in driving a vibratory article delivery apparatus, said electromagnetic drive comprising:
   a center plate;
   an armature carried on said plate;
   a first elastomeric frame fixedly attached to one side of said center plate;
   a second elastomeric frame fixedly attached to the reverse side of said center plate;
   top and bottom plates fixedly attached to said first and second elastomeric frames respectively;
   an electromagnet fixedly located between top and bottom plates;
   a first plurality of auxiliary elastomeric springs engaged to said top plate and arranged for selective engagement with said center plate by advancement of selected auxiliary elastomeric springs from said top plate toward said center plate; and
   a second plurality of auxiliary elastomeric springs engaged to said bottom plate and arranged for selective engagement with said center plate by advancement of selected auxiliary elastomeric springs from said bottom plate toward said center plate.

19. The drive according to claim 18, wherein said top and bottom plates include threaded holes, and each of said auxiliary springs comprises an adjusting bolt threaded into one of said holes, advancement of said adjusting bolts pressing said elastomer spring element to said center plate.

20. The drive according to claim 18, wherein said first and second plurality of auxiliary elastomeric springs are manually selectively engaged with said center plate.

21. The drive according to claim 7, wherein said first and second plurality of auxiliary elastomeric springs are selectively engaged with said center plate by forces exerted externally of said top and bottom plates, without requiring dissassembly of said drive.

* * * * *